(12) United States Patent
Anson et al.

(10) Patent No.: US 7,990,899 B2
(45) Date of Patent: Aug. 2, 2011

(54) METHOD AND APPARATUS FOR EXPANDING CONFERENCE SIZES

(75) Inventors: Russell Norman Anson, Nashua, NH (US); Ignacio Miranda Gonzalez, Madrid (ES)

(73) Assignee: Avaya Inc., Basking Ridge, NJ (US)

( * ) Notice: Subject to any disclaimer, the term of this patent is extended or adjusted under 35 U.S.C. 154(b) by 1098 days.

(21) Appl. No.: 11/755,236

(22) Filed: May 30, 2007

(65) Prior Publication Data

US 2008/0043645 A1 Feb. 21, 2008

Related U.S. Application Data

(60) Provisional application No. 60/819,317, filed on Jul. 7, 2006.

(51) Int. Cl.
*H04L 12/26* (2006.01)

(52) U.S. Cl. .......................................... 370/260; 370/270

(58) Field of Classification Search ........... 370/260–271
See application file for complete search history.

(56) References Cited

U.S. PATENT DOCUMENTS

| | | | | |
|---|---|---|---|---|
| 6,633,324 | B2 * | 10/2003 | Stephens, Jr. | 348/14.09 |
| 6,728,221 | B1 * | 4/2004 | Shaffer et al. | 370/260 |
| 7,009,943 | B2 * | 3/2006 | O'Neil | 370/260 |
| 7,023,465 | B2 * | 4/2006 | Stephens, Jr. | 348/14.09 |
| 2002/0064136 | A1 * | 5/2002 | O'Neil | 370/267 |
| 2005/0163062 | A1 * | 7/2005 | Salesky et al. | 370/260 |

* cited by examiner

*Primary Examiner* — Hong Cho
(74) *Attorney, Agent, or Firm* — Joseph B. Ryan; Jason Paul DeMont; Wayne S. Breyer

(57) ABSTRACT

Techniques are disclosed for conference expansion in a conferencing system. For example, a method of providing for conference expansion in a conferencing system includes the following steps. At least one port is reserved in an original conference allocated in the conferencing system. A hub conference is allocated, when a maximum number of participants for the original conference is reached. A calculated number of ports in the hub conference are reserved for linking to the original conference and to a corresponding number of expansion conferences when allocation of at least one of the number of expansion conferences is called for. The hub conference is linked to the original conference via the reserved port of the original conference and one of the reserved ports of the hub conference.

22 Claims, 3 Drawing Sheets

100

200

300

320

METHOD AND APPARATUS FOR EXPANDING CONFERENCE SIZES

CROSS REFERENCE TO RELATED APPLICATION

This application claims priority to the U.S. provisional patent application identified by Ser. No. 60/819,317, filed on Jul. 7, 2006, and entitled "Method and Apparatus for Expanding Conference Sizes," the disclosure of which is incorporated by reference herein.

FIELD OF THE INVENTION

The present invention generally relates to conferencing systems and, more particularly, to techniques for automatically expanding sizes of conferences being conducted in such a conferencing system.

BACKGROUND OF THE INVENTION

Conventional conferencing systems typically allow some form of linking. They are normally used to link geographically remote conferencing systems so as to reduce bandwidth carried over network links. Because of this, they usually require some manual intervention to set up. Identical conferences are created on each conference server and the user dials out to the remote conference system, which is joined to the conference as a normal participant. This is also referred to as conference cascading or a multi-server meeting.

A serious problem that arises when cascading the conferences is that the audio delay between the first caller in the chain and the last would be quite large contributing to audio quality degradation.

Accordingly, there is a need for techniques for expanding sizes of conferences being conducted in a conferencing system that alleviate or eliminate the media degradation problem as well as other problems.

SUMMARY OF THE INVENTION

Principles of the invention provide techniques for conference expansion in a conferencing system.

For example, in a first aspect of the invention, a method of providing for conference expansion in a conferencing system includes the following steps. At least one port is reserved in an original conference allocated in the conferencing system. A hub conference is allocated, when a maximum number of participants for the original conference is reached. A calculated number of ports in the hub conference is reserved for linking to the original conference and to a corresponding number of expansion conferences when allocation of at least one of the number of expansion conferences is called for. The hub conference is linked to the original conference via the reserved port of the original conference and one of the reserved ports of the hub conference.

The calculated number of ports reserved in the hub conference may be equal to a single conference participant capacity value minus a quotient of a total system participant capacity value over the single conference participant capacity value.

The method may include allocating a first one of the number of expansion conferences, when called for, and linking the first expansion conference to the hub conference via one of the calculated number of ports reserved in the hub conference and a reserved port of the first expansion conference.

The first expansion conference may be allocated when a maximum number of participants for the hub conference is reached. Alternatively, the first expansion conference may be allocated when the hub conference is allocated such that the hub conference serves only as a linking facility between the original conference and the first expansion conference, and the first expansion conference is allocated for additional participants.

The method may also include allocating a second one of the number of expansion conferences, when called for, and linking the second expansion conference to the hub conference via another one of the calculated number of ports reserved in the hub conference and a reserved port of the second expansion conference.

The conferencing system may include one or more media servers for implementing the original conference, the hub conference and the expansion conferences. The conferencing system may also include a conference controller for controlling one or more of the reservation, allocation and linking steps.

Advantageously, in accordance with this first aspect of the invention, participants in any one of the conferences are within no more than two links from all other participants in any one of the conferences.

Further, the method may also include automatically re-assigning participants in any one of the conferences when any one of the conferences fails.

In a second aspect of the invention, a method of providing for conference expansion in a conferencing system includes the following steps. At least one port is reserved in an original conference allocated in the conferencing system. A first expansion conference is allocated, when a maximum number of participants for the original conference is reached. At least two ports are reserved in the first expansion conference for linking to the original conference and to a second expansion conference when allocation of a second expansion conference is called for. The first expansion conference is linked to the original conference via the reserved port of the original conference and one of the two reserved ports of the first expansion conference.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Although described below primarily in the context of audio conferences, it is to be appreciated that principles of the present invention can be readily adapted in a straightforward manner to other types of conferences, such as video conferences, multimedia conferences, etc. Further, the term "conference" is generally understood to refer to a discussion among two or more parties or entities.

A conferencing system in an illustrative embodiment of the invention uses one or more media servers to mix audio or other media streams for conferences. These media servers impose limits on the number of ports per conference. The number is usually much smaller than the total number of ports for the system.

In some cases the limit may be imposed by the size of the media server itself while the application number of total ports can be much higher, in that case, expansion is provided across multiple media servers. As is known, "ports" are numbers assigned to user sessions and server applications in an Internet Protocol (IP) based conferencing system (i.e., one that is implemented across an IP network). Expanding the number of people per conference bridge can result in audio degradation, because links introduce a delay in the audio. As is known, a "conference bridge" is a facility or mechanism within the conferencing system that connects multiple callers together.

Principles of the present invention provides automatic linking so no manual intervention is required, anticipate the characteristics of the media server and its limitations, and provide expansion as needed automatically. This process happens automatically, based on system configuration and messages exchanged between components of the conferencing system, and is transparent to users. An illustrative embodiment will also use an algorithm, described below, to find the best case scenario to allocate the channels and optimize the usage of the system when creating the links and the conferences, reducing the number of links between callers to minimize the impact in the audio quality.

Figure 1:
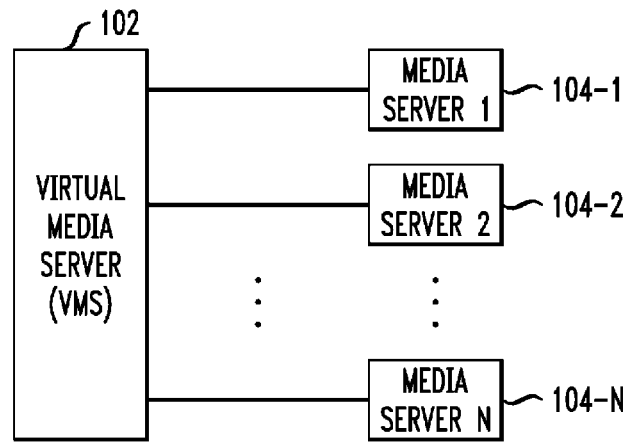
FIG. 1 illustrates a conferencing system according to one embodiment of the present invention.

FIG. 1 shows a diagram of one possible system configuration in the illustrative embodiment. The portion of the system 100 shown in this example includes Virtual Media Server (VMS) 102 which communicates with a number of media servers 1, 2, . . . N (denoted respectively as 104-1, 104-2, . . . 104-N), where N may be any arbitrary number. The VMS may be implemented as one or more software modules configured for execution by an otherwise conventional system controller or other processing device of the system (one example of such a device is illustrated and will be described below in the context of FIG. 4). In general, such a processing device, not explicitly shown in the figure, may comprise one or more processors and one or more memories, with software code for implementing at least a portion of a technique as described herein being stored in the one or more memories and executed by the one or more processors. One skilled in the art could readily program such a processing device, or a set of such devices, to implement the techniques described herein.

The VMS itself may be viewed as an example of a type of conference controller, and may be implemented using one or more processing devices.

One or more of the media servers may be Session Initiation Protocol (SIP) based media servers, although other types of media servers could be used, in any combination. As is known, the Session Initiation Protocol (SIP) is an application-level control protocol for setting up and tearing down sessions with one or more participants. Such sessions may typically involve Internet telephone calls (i.e., so-called Voice over Internet Protocol or VoIP calls) or video calls. However, SIP may be used in other applications where session initiation is required. Also, it is understood that SIP is merely a signaling (control) protocol which serves to create, modify and terminate sessions, while other session protocols (e.g., Real-time Transport Protocol or RTP) are used to handle the actual transfer of the media content (e.g., audio or video data).

The VMS in the illustrative embodiment allocates participants to conferences on one or more of the media servers. Although not shown in the figure, one or more media server interface elements may be provided to act as respective intermediaries between the VMS and the respective media servers. If the VMS and the multiple media servers are implemented on a common platform or are otherwise not physically separated from one another, such interfaces may be eliminated.

One feature of the illustrative embodiment is that it provides a solution for automatic linking, so it is completely transparent for the users and the system in effect has no conference size limitations.

Another feature of the illustrative embodiment is that the VMS allocates the resources for linking in such a way that the number of links between callers is reduced so one port is reserved on each conference to allow for linking. When a conference reaches the limit of callers imposed by the media server, minus the reserved port, the VMS allocates a hub conference bridge, and links the hub conference bridge to the original conference bridge. After this, when new callers arrive for the same conference, the VMS runs an algorithm to determine how many participants can be allocated in the hub conference bridge, which is going to be equal to (Single Conference Capacity) minus ((Total System Capacity) over Single Conference Capacity)), so the VMS reserves the rest of the ports to link with more conference bridges in case the overall conference reaches the total capacity of the system. The other ports left will be used for new callers coming in, such that those callers will only have one link between them and the rest of the callers.

The number of ports that need to be reserved comes from the following:

$(TotalCap-X)/(ConfCap-1)=X$ where X results=$TotalCap/ConfCap$.

TotalCap=The total capacity of the conferencing system.

X=Number of ports to reserve in the hub conference to be able to link up to the total capacity.

ConfCap=Maximum conference bridge capacity in the media server.

If more callers arrive after exceeding the number of ports available on the hub conference bridge, the VMS will start allocating expansion conferences and linking them to the hub. Media flows through the links between the participants in the expansion conference and the original conference. New participants are placed in the expansion conference until the expansion conference too reaches the limit. Then, another expansion conference is allocated and linked to the hub, and so on.

Advantageously, all participants are within two links from all others, limiting the media latency to a maximum of three times of what it would be if there were no links. Load balancing on the media servers is taken into account by the VMS when deciding where to place an expansion or hub conference. If a media server fails, the expansion conference, hub and participants on that server can be moved to another server, and the links re-established.

The per-conference port limit is overcome using hub and expansion conferences linked to the original. The VMS, which as previously noted can be implemented in software, calculates the number of people that can be allocated in each conference to make sure there is always space and room for expansion.

Figure 2:
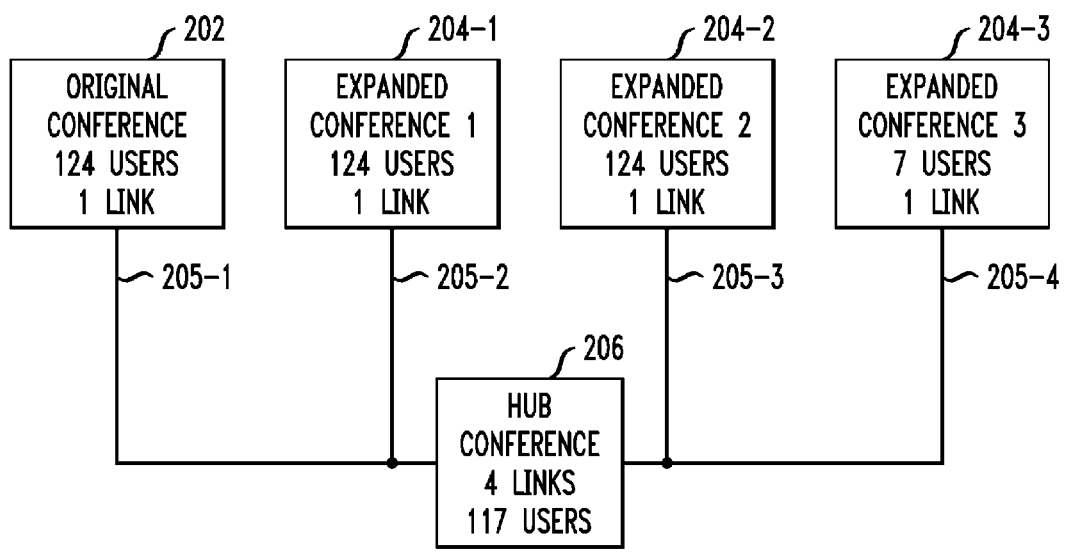
FIG. 2 illustrates a conference according to one embodiment of the present invention.

FIG. 2 shows an example of a conference with 496 participants distributed on a media server with a limit of 125 ports per conference. The expansion conferences are dynamically created and deleted as participants join and leave the conference. The original conference (accommodated by the first conference bridge 202) always exists until it is terminated by the controlling system (i.e. the VMS). Expansion conferences (accommodated by expansion conference bridges 204-1, 204-2, and 204-3) are created on the media server which currently has the lowest loading. The links (205-1, 205-2, 205-3, and 205-4) between conference bridges in this diagram represent RTP (Real Time Protocol) media streams, although it is to be appreciated that the invention does not require the use of this particular protocol or any other protocol referred to herein in conjunction with the illustrative embodiments.

The algorithm executed by the VMS allocates 124 callers in the first conference bridge (202), then creates a link to the hub conference (accommodated by the hub conference bridge 206). In the hub conference, the VMS calculates how many links need to be reserved to be able to reach the total capacity of the system, this is the total capacity over the number of people per conference. Assuming total capacity 1000, that would be 1000/125=8, so that a total of 8 ports need to be reserved in the hub conference bridge for expansion conference bridges (204-1, 204-2, and 204-3). Thus, this allows the VMS to have 125−8=117 participants in the hub bridge.

Figure 3A:
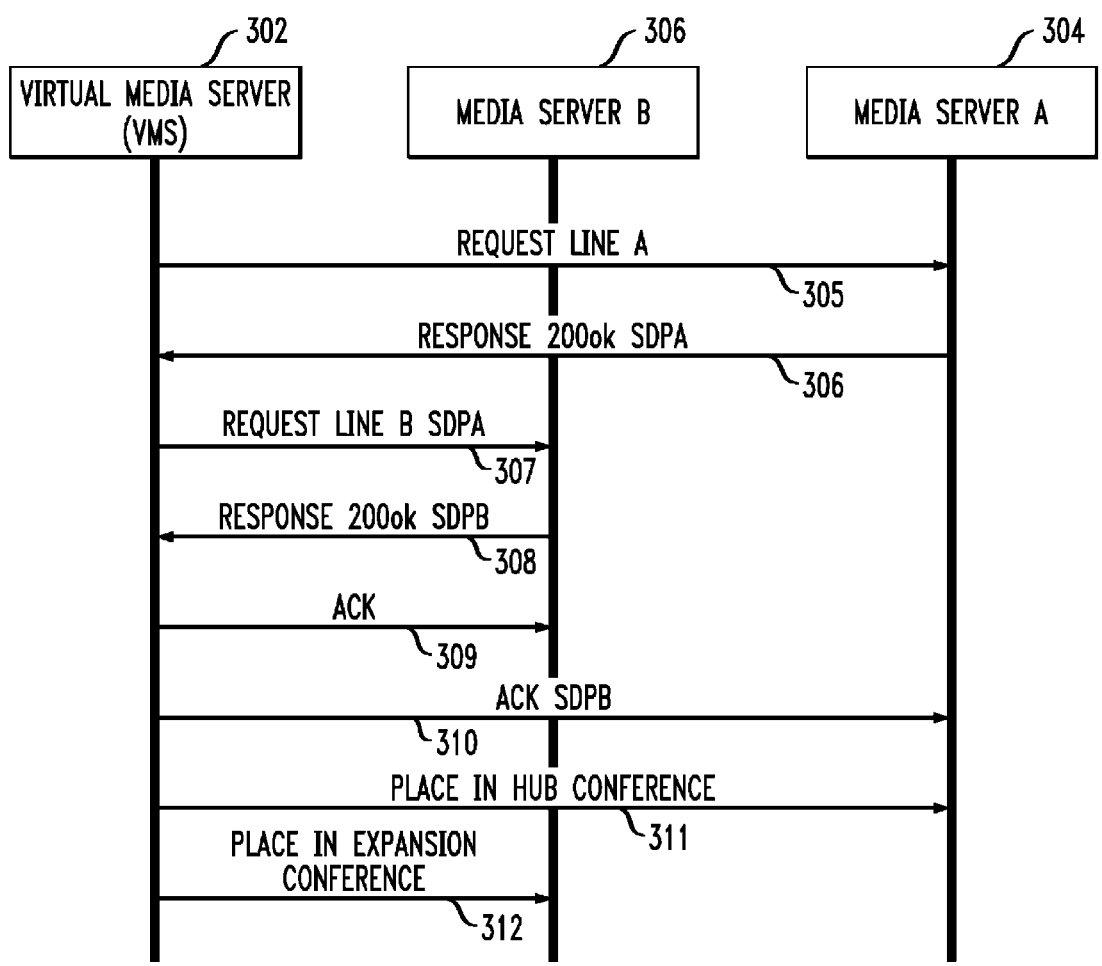
FIG. 3A illustrates a conference link creation process according to one embodiment of the invention.

An exemplary process for conference link creation will now be described with reference to the signal flow diagram 300 of FIG. 3A. The diagram shows how a conference link is created by VMS (302). To create a link from one media server to another or from a media server to itself we will use two media server resources, and will interconnect one with the other, so that media is propagated from one media server to another. The two media servers are denoted in this example as Media Server A (304) and Media Server B (306), and may be viewed as two of the N media servers referred to in conjunction with the diagram of FIG. 1. The process is as follows:

1. The VMS requests Line A with no SDP (Session Description Protocol) on Media
   Server A (step 305).
2. Once the VMS receives the successful response (200ok) from Media Server A/Line A with the SDP for that line (step 306), then the VMS requests Line B in media Server B with the SDP received (step 307).
3. Once the VMS receives the successful response (200ok) from Media Server B/Line B (step 308), then the VMS sends the acknowledgment to both lines (309 and 310), the one going to A (310) includes the SDP received from Media Server B.
4. Now, at this point, both lines are interconnected and the audio flows full duplex from one media server to the other. Any modification to the media requested by either of the lines will propagate to the other line.
5. The VMS places line A in the hub conference (step 311), and line B in the first expansion conference (step 312). At this point, it is to be understood that the original conference is connected to the hub conference. It is further to be appreciated that the process in FIG. 3A is repeated each time the creation of a new expansion conference is needed to increase the capacity of the overall conference.

This illustrative embodiment may utilize the capabilities of an application server to span a conference over multiple media servers, potentially from various vendors, to address inherent limitations in the maximum conference sizes allowed on the media server, and to introduce fault tolerance and redundancy into the architecture.

The illustrative embodiment includes a number of features that are distinct from conventional arrangements, such as, for example, the use of a hub conference and dynamically created expansion conferences, the algorithm to allocate users using the lower number of links between conferences, and the automatic re-assignment of conferences and participants to other media servers in the event of media server failure.

Figure 3B:
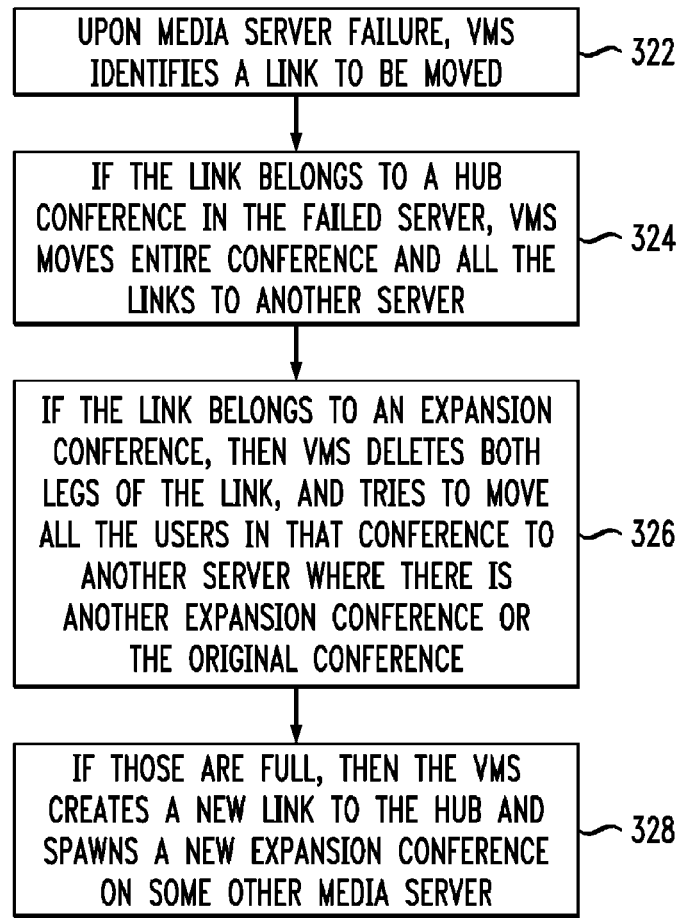
FIG. 3B illustrates a conference failure recovery process according to one embodiment of the invention.

FIG. 3B illustrates a conference failure recovery process according to one embodiment of the invention. That is, process 320 in FIG. 3B illustrates how the VMS automatically re-assigns conferences and participants to other media servers in the event of media server failure.

In the event of one of the media servers failing, the VMS can move all the links created in that media server to an operational media server. The process is as follows:

1. The VMS identifies a link to be moved (step 322), i.e., determines if the link belongs to a hub conference or if it belongs to an expansion conference.
2. If the link belongs to a hub conference in the failed server, the VMS moves the entire conference and all the links to another server (step 324).
3. If the link belongs to an expansion conference, then the VMS deletes both legs of the link, and tries to move all the users in that conference to another server where there is another expansion conference or the original conference (step 326).
4. If those are full, then the VMS creates a new link to the hub and spawns a new expansion conference on some other media server (step 328). Basically, the callers that are on an expansion conference in a media server that fails will be moved using the above-described conference expansion algorithm (illustrated in FIGS. 2 and 3A) that places people in a conference so they are allocated on spare space or that generates new expansion resources.

This recovery process allows all the calls to stay up and makes sure that the communications between conferences that are linked are not lost. Advantageously, the process re-allocates all the resources of the failed media server the best way possible.

One advantage of the above illustrative embodiments is convenience for the system users, in that they are freed from having to consider limitations placed on conference size by media servers. The system also offers increased reliability by dealing with media server failure. It also allows media servers with different specifications and limitations to be used interchangeably without affecting the users.

Other solutions may require, for example, that the user set up multiple conferences using a conference scheduler, and explicitly specify the links. The system of the illustrative embodiment dynamically expands the conferences using automatic linking as described above, until system limits are reached. It thus takes the burden of setting up linked conferences off the user. As indicated previously, it also deals with the problem of one or more media servers failing during a conference, and does this in a way that does not require manual intervention from the user. It also optimizes the use of the media server resources, using an allocation algorithm as previously described.

The illustrative embodiment is particularly useful in situations where a conferencing system has access to external media server resources and requires a way of having conferences exceed the size limitations placed by the media servers. As noted above, principles of the present invention can be implemented at least in part in the form of software that can be stored and executed in an otherwise conventional processing device or devices of a conferencing system, providing such systems with an ability to support larger conferences than would otherwise be possible.

It is to be appreciated that the above-described embodiment is presented by way of example only. Numerous alternative embodiments will be readily apparent to those skilled in the art.

For example, one alternative embodiment may involve not adding any caller to the hub conference. In this case the conferees will only be in the expansion conference, and the hub conference will only contain links. That way there is no need to do any calculations of how many people to put in the hub conference, since it will only contain links.

As a more particular illustration of this alternative embodiment, assume again that we want to create a 496 participant conference and the media server only allows 125 participants per conference bridge. We will use Conference Size/(max number of people per bridge−1), that is 496/124=4 expansion conference bridges, and then all the linking will be done with one single hub conference bridge. That is four conferences with 124 participants each and one link and then one conference bridge that we call the hub with four links and no real callers. The disadvantage here is that every caller will have his or her audio traversing two links when talking to the callers in the other conference bridges.

Another alternative embodiment may involve adding users to conferences as they come and cascading them. In this case, there has to always be two links per conference bridge to cascade new conferences, and it will create a new bridge when it is needed for new callers. The number of conference bridges needed would be: (Conference Size−1)/(max number of people per bridge−2). Using the numbers from the previous example, 496 participants and a maximum of 125 participants per bridge, the number of conferences=496/123=4.03, which should be rounded up to the next number, in this case five. So Conference 1 will have 123 participants and two links and will use one of those links to link into Conference 2 which will have 123 participants, and so on with all the conferences until Conference 5 that will have four participants and a link. The disadvantage here is that there could be a lot of links between the first participant and the last, and each link adds around 20 to 40 milliseconds of delay. A variant of this mechanism is to only use one link in the first conference, since the other link is not really needed, but such an approach can limit the expansion. Another issue with this particular alternative is that it can end up with no participants in a conference bridge and only the two links to interconnect the other conferences, which is a waste of resources. A clean up process may be used to remove those conferences that are unnecessary when some of the participants leave and one conference bridge becomes empty in the chain.

Figure 4:
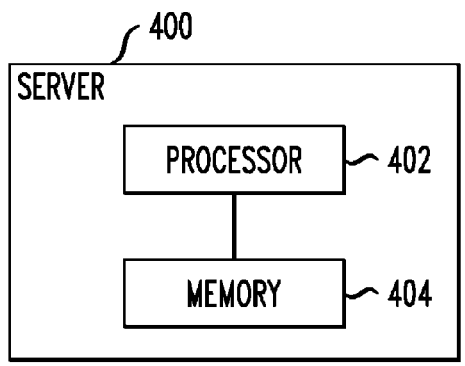
FIG. 4 illustrates a computing architecture of a device for use in implementing conference expansion according to one embodiment of the present invention.

Lastly, FIG. 4 illustrates a computing architecture 400 of a device for use in implementing the conference expansion techniques of the invention. That is, FIG. 4 may be considered a computing architecture used to implement the VMS, a media server, an application server, a conference bridge, etc. Of course, it is to be understood that the invention is not limited to any particular computing system implementation.

In this illustrative implementation, a processor 402 for implementing at least a portion of the methodologies of the invention is operatively coupled to a memory 404.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

Accordingly, one or more computer programs, or software components thereof, including instructions or code for performing the methodologies of the invention, as described herein, may be stored in memory 404 and, when ready to be utilized, loaded in whole or in part and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing for conference expansion in a conferencing system, comprising the steps of:
   reserving at least one port in an original conference allocated in the conferencing system;
   allocating a hub conference, when a maximum number of participants for the original conference is reached;
   reserving a calculated number of ports in the hub conference for linking to the original conference and to a corresponding number of expansion conferences when allocation of at least one of the number of expansion conferences is called for; and
   linking the hub conference to the original conference via the reserved port of the original conference and one of the reserved ports of the hub conference.

2. The method of claim 1, wherein the calculated number of ports reserved in the hub conference is equal to a single conference participant capacity value minus a quotient of a total system participant capacity value over the single conference participant capacity value.

3. The method of claim 1, further comprising the steps of allocating a first one of the number of expansion conferences, when called for, and linking the first expansion conference to the hub conference via one of the calculated number of ports reserved in the hub conference and a reserved port of the first expansion conference.

4. The method of claim 3, wherein the first expansion conference is allocated when a maximum number of participants for the hub conference is reached.

5. The method of claim 3, wherein the first expansion conference is allocated when the hub conference is allocated such that the hub conference serves only as a linking facility between the original conference and the first expansion conference, and the first expansion conference is allocated for additional participants.

6. The method of claim 3, further comprising the steps of allocating a second one of the number of expansion conferences, when called for, and linking the second expansion conference to the hub conference via another one of the calculated number of ports reserved in the hub conference and a reserved port of the second expansion conference.

7. The method of claim 1, wherein the conferencing system comprises one or more media servers for implementing the original conference, the hub conference and the expansion conferences.

8. The method of claim 1, wherein the conferencing system comprises a conference controller for controlling one or more of the reservation, allocation and linking steps.

9. The method of claim 1, wherein participants in any one of the conferences are within no more than two links from all other participants in any one of the conferences.

10. The method of claim 1, further comprising the step of automatically re-assigning participants in any one of the conferences when any one of the conferences fails.

11. A method of providing for conference expansion in a conferencing system, comprising the steps of:
reserving at least one port in an original conference allocated in the conferencing system;
allocating a first expansion conference, when a maximum number of participants for the original conference is reached;
reserving at least two ports in the first expansion conference for linking to the original conference and to a second expansion conference when allocation of a second expansion conference is called for; and
linking the first expansion conference to the original conference via the reserved port of the original conference and one of the two reserved ports of the first expansion conference.

12. Apparatus for controlling conference expansion in a conferencing system, comprising:
a memory; and
at least one processor coupled to the memory and operative to cause: (i) reservation of at least one port in an original conference allocated in the conferencing system; (ii) allocation of a hub conference, when a maximum number of participants for the original conference is reached; (iii) reservation of a calculated number of ports in the hub conference for linking to the original conference and to a corresponding number of expansion conferences when allocation of at least one of the number of expansion conferences is called for; and (iv) linking of the hub conference to the original conference via the reserved port of the original conference and one of the reserved ports of the hub conference.

13. The apparatus of claim 12, wherein the calculated number of ports reserved in the hub conference is equal to a single conference participant capacity value minus a quotient of a total system participant capacity value over the single conference participant capacity value.

14. The apparatus of claim 12, wherein the at least one processor is further operative to cause allocation of a first one of the number of expansion conferences, when called for, and linking of the first expansion conference to the hub conference via one of the calculated number of ports reserved in the hub conference and a reserved port of the first expansion conference.

15. The apparatus of claim 14, wherein the first expansion conference is allocated when a maximum number of participants for the hub conference is reached.

16. The apparatus of claim 14, wherein the first expansion conference is allocated when the hub conference is allocated such that the hub conference serves only as a linking facility between the original conference and the first expansion conference, and the first expansion conference is allocated for additional participants.

17. The apparatus of claim 14, wherein the at least one processor is further operative to cause allocation of a second one of the number of expansion conferences, when called for, and linking of the second expansion conference to the hub conference via another one of the calculated number of ports reserved in the hub conference and a reserved port of the second expansion conference.

18. The apparatus of claim 12, wherein the conferencing system comprises one or more media servers for implementing the original conference, the hub conference and the expansion conferences.

19. The apparatus of claim 12, wherein the at least one processor comprises a virtual media server.

20. The apparatus of claim 12, wherein participants in any one of the conferences are within no more than two links from all other participants in any one of the conferences.

21. The apparatus of claim 12, wherein the at least one processor is further operative to cause automatic re-assignment of participants in any one of the conferences when any one of the conferences fails.

22. Apparatus for controlling conference expansion in a conferencing system, comprising:
a memory; and
at least one processor coupled to the memory and operative to cause: (i) reservation of at least one port in an original conference allocated in the conferencing system; (ii) allocation of a first expansion conference, when a maximum number of participants for the original conference is reached; (iii) reservation of at least two ports in the first expansion conference for linking to the original conference and to a second expansion conference when allocation of a second expansion conference is called for; and (iv) linking of the first expansion conference to the original conference via the reserved port of the original conference and one of the two reserved ports of the first expansion conference.

* * * * *